United States Patent
Reinheimer et al.

(10) Patent No.: US 7,211,171 B2
(45) Date of Patent: May 1, 2007

(54) MULTIPLY TISSUE PRODUCT

(75) Inventors: Horst Alfred Reinheimer, Kelkheim (DE); Aniruddha Chatterjee, Koenigstein (DE); Joachim von Heimburg, Geneva (CH)

(73) Assignee: The Procter & Gamble Company, Cincinnati, OH (US)

( * ) Notice: Subject to any disclaimer, the term of this patent is extended or adjusted under 35 U.S.C. 154(b) by 559 days.

(21) Appl. No.: 10/336,190

(22) Filed: Jan. 3, 2003

(65) Prior Publication Data
US 2003/0127202 A1   Jul. 10, 2003

Related U.S. Application Data

(63) Continuation-in-part of application No. 10/309,858, filed on Dec. 4, 2002, now abandoned.

(30) Foreign Application Priority Data
Jan. 5, 2002  (EP) ................. 02000365

(51) Int. Cl.
D21H 27/32 (2006.01)
B32B 29/00 (2006.01)

(52) U.S. Cl. ............. 162/117; 162/124; 162/125; 162/127; 428/156; 428/340; 428/537.5

(58) Field of Classification Search ........ 162/123–125, 162/127–130, 117; 428/537.5, 340, 156
See application file for complete search history.

(56) References Cited

U.S. PATENT DOCUMENTS

| | | | | |
|---|---|---|---|---|
| 2,077,015 A | * | 4/1937 | Schacht | 162/125 |
| 3,070,095 A | * | 12/1962 | Torr | 428/323 |
| 3,102,836 A | * | 9/1963 | Griswold | 162/108 |
| 3,256,138 A | * | 6/1966 | Welch et al. | 162/124 |
| 3,347,236 A | * | 10/1967 | Torr | 604/364 |
| 3,941,634 A | * | 3/1976 | Nisser et al. | 156/79 |
| 4,619,734 A | * | 10/1986 | Andersson | 162/111 |
| 5,545,472 A | | 8/1996 | Koubek et al. | |
| 5,928,472 A | * | 7/1999 | Watkins | 162/132 |
| 5,990,377 A | | 11/1999 | Chen et al. | |
| 6,019,871 A | * | 2/2000 | Rokman et al. | 162/101 |
| 6,328,850 B1 | * | 12/2001 | Phan et al. | 162/123 |
| 6,395,957 B1 | | 5/2002 | Chen et al. | |
| 2002/0117277 A1 | * | 8/2002 | Johnson et al. | 162/124 |
| 2002/0133131 A1 | | 9/2002 | Rangachari et al. | |
| 2003/0000666 A1 | * | 1/2003 | Mansson et al. | 162/123 |

(Continued)

FOREIGN PATENT DOCUMENTS

EP  851062 A2  * 7/1998

(Continued)

Primary Examiner—José A. Fortuna
(74) Attorney, Agent, or Firm—Betty J. Zea; David M. Weirich; Ken K. Patel

(57) ABSTRACT

A multiply tissue product comprising at least two plies of a tissue interconnected to each other. The multiply tissue further comprises a layer including super absorbent fiber-like particles in at least one interface region in between two adjacent plies of the tissue webs, wherein the basis weight of the layer is between about 0.5% and about 50% of the overall basis weight of the two adjacent plies of tissue.

17 Claims, 1 Drawing Sheet

U.S. PATENT DOCUMENTS

| | | |
|---|---|---|
| 2003/0056917 A1* | 3/2003 | Jimenez .................... 162/158 |
| 2003/0127202 A1* | 7/2003 | Reinheimer et al. ........ 162/124 |
| 2004/0099388 A1* | 5/2004 | Chen et al. ................. 162/134 |
| 2004/0123963 A1* | 7/2004 | Chen et al. ................. 162/134 |
| 2004/0168779 A1* | 9/2004 | Silenius et al. ............. 162/124 |
| 2004/0244927 A1* | 12/2004 | Pianta et al. ................ 162/124 |
| 2004/0250969 A1* | 12/2004 | Luu et al. .................... 162/123 |
| 2005/0022955 A1* | 2/2005 | Ward et al. ................. 162/123 |

FOREIGN PATENT DOCUMENTS

| | | |
|---|---|---|
| EP | 1 260 626 A2 | 11/2002 |
| EP | 1 260 627 A1 | 11/2002 |
| EP | 1327716 A1 * | 7/2003 |
| WO | WO 00/19955 | 4/2000 |
| WO | WO 01/12902 A1 | 2/2001 |
| WO | WO 01/14641 A1 | 3/2001 |
| WO | WO 01/97731 A2 | 12/2001 |
| WO | WO 02/40774 A2 | 5/2002 |

* cited by examiner

MULTIPLY TISSUE PRODUCT

CROSS-REFERENCE TO RELATED APPLICATION

This application is a continuation-in-part of U.S. application Ser. No. 10/309,858, filed on Dec. 4, 2002 now abandoned.

FIELD OF THE INVENTION

The invention refers generally to a multiply tissue product, and more specifically to a multiply tissue product comprising one layer of super absorbent material disposed between the plies of tissue.

BACKGROUND OF THE INVENTION

Tissue products are known and broadly used in making handkerchiefs, napkins and paper towels or so-called "kitchen rolls". These kinds of paper products often comprise two or more plies of tissue, the material for which is selected from conventional tissue or special kinds of tissues, such as so-called "through-air-dried tissue" or "differential-density-tissue". The latter is often made via a patterned paper making belt and through-air-drying technology.

Especially when used for kitchen rolls, the tissue webs representing the two or more plies of the kitchen towel are often each embossed, the embossments forming knob-like elevations in the tissue web. Prior art and kitchen rolls actually marketed use so-called "nested-embossing" or "knob-to-knob embossing". In either case, both the webs are interconnected with the knob elevations facing each other. In nested-embossing the respective knobs of both the webs are positioned offset to each other whereas in knob-to-knob embossing the respective knobs of both the webs are aligned and contacting each other in head-to-head relation.

For the interconnection of the two (or more) plies of the tissue web the most common technique is to laminate the tissue plies together by applying a thin coating of glue to the heads of the knobs of one of the two embossed tissue webs and by leading both the webs either in "knob-to-knob" fashion directly upon each other through the nip of the steel embossing rolls or through the nip of a so-called "marrying roll" and one of the steel embossing rolls ("nested-embossing").

An important feature of multiply tissue towels especially when used as kitchen roll is the absorbent capacity, which substantially is defined by the properties of the tissue. Further, consumers like to have a soft towel with a so-called "bulky grip", which is mainly achieved by the discussed embossing of the tissue webs.

Concerning the absorbency of hygienic products like diapers, sanitary napkins or panty liners, it has been known for decades to incorporate super absorbent particles into the absorbent core of these products. In this connection it is common practice to mix the cellulosic fibers forming the absorbent core by, e.g. air-laying, and super absorbent particles onto a belt. By the incorporation of super absorbent particles into the absorbent core, the absorbency capacity can be drastically increased.

As concerns the absorbent capacity of paper towels it is known, for example, to mix super absorbent materials into paper webs to create tissue products such as facial tissues, paper towels, bath tissues and other similar products. Typical for the products described in the prior art is the fact that the super absorbent materials are mixed with a liquid suspension of fibrous papermaking material and may either be applied in a dry state or a so-called "pre-swollen state". This swelling of the super absorbent material is reported to have a variety of beneficial effects on web formation leading e.g. to a tissue product having higher bulk, permeability and void volume.

The amount of super absorbent material utilized can vary depending on the desired characteristics of the resulting tissue product. Super absorbent material concentrations between about 0.1% by weight to about 10% by weight are disclosed in the prior art. By applying a super absorbent material present in an amount of about 1% by weight of the fibrous material of the prior art tissue webs an increase of the absorbency capacity of the tissue by about 15% can be achieved.

The prior art discloses a broad variety of materials, basis weights and kinds of incorporating the super absorber into the tissue web. However, the super absorbent materials are contained in the tissue material, i.e. the super absorbent particles are intermixed with the tissue fibers. Thus, according to the prior art, the basic papermaking process leading to a tissue web has to be adapted to the need of intermixing a super absorbent material. This means that additional constructive arrangements concerning the addition of the super absorbent material have to be supplied along the papermaking process line. Further the papermaking process conditions have to be adapted to the fact that a super absorber is additionally present in the tissue web, as e.g. the drying behavior of the super absorbers is very different from that of the tissue fibers.

Accordingly, it would be desirable to provide for a multiply tissue product which has the benefits of incorporated super absorbent materials, while avoiding the discussed disadvantages in connection with the incorporation of super absorbers into the tissue web itself.

SUMMARY OF THE INVENTION

The present invention is directed to a multiply tissue product comprising at least two plies of tissue interconnected to each other forming an interface region between the two plies, and a layer comprising super absorbent fiber-like particles in at least the interface region between two adjacent plies of the tissue, wherein the basis weight of the layer is between about 0.5% and about 50% of the overall basis weight of the two adjacent plies of tissue defining the interface region.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE EMBODIMENTS

Figure 1:
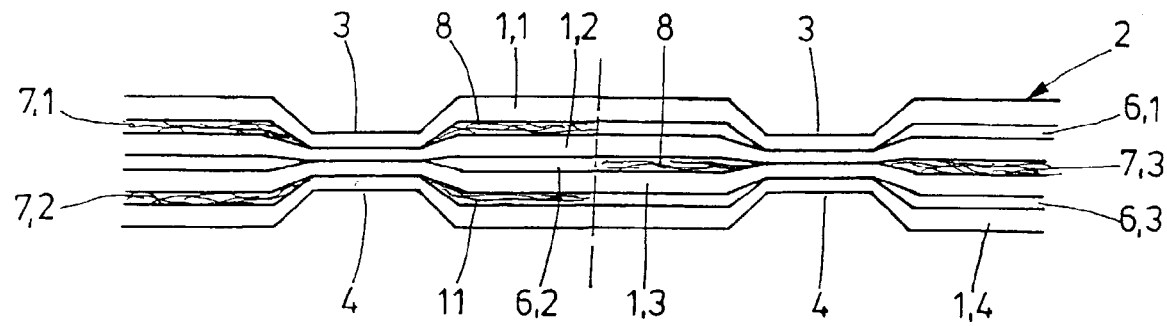
FIG. 1 is a partial diagrammatic section of a four-ply-towel in two embodiments.

FIG. 1 represents a tissue product comprising four plies 1.1 through 1.4 of a common tissue web 2 produced by a known papermaking process. For sake of clarity the fibers constituting the tissue web 2 are omitted in FIG. 1.

The four individual plies 1.1 through 1.4 are held together by impressions which are formed in each case by two embossed spots 3, 4 which are mutually aligned transversely to the main plane of the plies 1.1 through 1.4 and curved concavely inwardly from the two outer plies 1.1, 1.4 of the respective tissue web. The inner plies 1.2, 1.3 are thus enclosed. The embossed spots 3, 4 are applied in such a way that the plies of tissue 1.1 through 1.4 are somewhat squeezed together by the embossing action in the base region 5 of the embossed spots 3, 4 and are accordingly "bonded" to each other. The stability of this "bonding" is enhanced by a thin glue layer applied to the plies 1.1 through 1.4, e.g. by spraying. Thus atomized glue spots are applied to the surface of the plies 1.1 through 1.3 facing the adjacent ply 1.2, 1.3 and 1.4, respectively.

The basic paper towel structure shown in FIG. 1 is known as knob-to-knob embossing. One exemplary production process is disclosed in EP 0 755 212 B1, which is incorporated by reference herein.

The plies 1.1 through 1.4 are interconnected to each other side by side by the embossed spots 3, 4. Inasmuch two adjacent plies define an interface region 6.1, 6.2 and 6.3, respectively, in each of which a layer 7.1, 7.2 and 7.3 of super absorbent fiber-like particles 8 is incorporated. As is indicated on the left side of FIG. 1 the four-ply-towel comprises two layers 7.1 and 7.2 in both the outer interface regions 6.1 and 6.3. The central interface region 6.2 between plies 1.2 and 1.3 is not provided with such super absorbent fibers 8.

These fibers can be any suitable fibers. Exemplary suitable fibers are commercially available, e.g. under the trade name Camelot by Camelot Technologies, Ltd. The concentration of the super absorbent fibers 8 in the layers 7.1 and 7.2 may be in the order of about 0.5% to about 10% of the overall basis weight of the respective adjacent plies 1.1, 1.2 and 1.3, 1.4. One preferred range of the basis weight of the layers 7.1 and 7.2 is about 1% to about 3% of the overall basis weight. In absolute figures the super absorbent fiber-like particles 8 are applied with a basis weight of about 0.2 to about 5.0 g/m$^2$, and in certain embodiments, preferably of about 0.5 to about 2.0 g/m$^2$ in each layer 7.1 through 7.3. The length of the super absorbent fibers 8 ranges from about 3 to about 30 mm, and in certain embodiments, preferably from about 4 to about 10 mm. The fiber diameters can vary from about 5 to about 40 μm with a preferred range of about 20 to about 30 μm. The fiber density of the fiber-like particles 8 ranges from about 1.0 to about 2.0 g/cm$^3$, and in certain embodiments, preferably from about 1.3 to about 1.5 g/cm$^3$.

As is indicated in FIG. 1, right side, a single layer 7.3 of fiber particles 8 can also be provided solely in the central interface region 6.2 between plies 1.2 and 1.3, or in addition to any fiber particles 8 that may be located in any of the individual plies. This layer 7.3 has the same specifications as the layers 7.1 and 7.2, respectively.

The basis weight range of the individual plies commonly lies within about 14 to about 60 g/m$^2$. The individual tissue webs can be made of conventional tissue, of through-air-dried tissue or special kinds of tissue, e.g. so-called "differential-density-tissue", which is made by means of a patterned papermaking belt and through-air-drying technology. Examples for such differential-density-tissue are disclosed in EP 0 741 820 A1, which is incorporated by reference herein.

Figure 2:
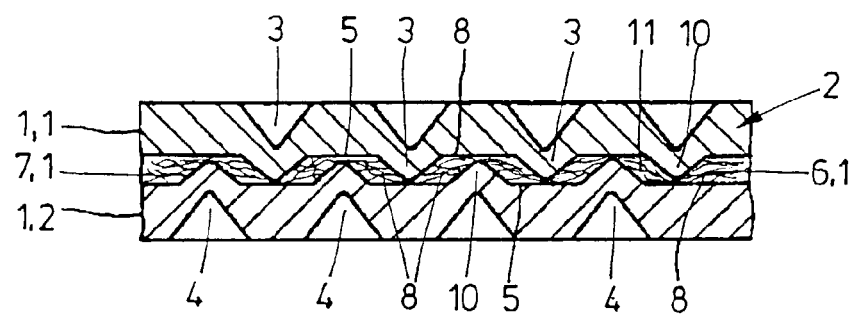
FIG. 2 is a partial diagrammatic section of a two-ply-towel in another embodiment.

In FIG. 2 a two-ply tissue towel 9 is shown which is produced by means of the so-called "nested-embossed technology" as will be described in connection with FIG. 3. As concerns the towel 9, each ply 1.1 and 1.2 is again provided with embossed spots 3, 4. Contrary to the embodiment of FIG. 1, however, these spots 3, 4 are not aligned with each other but arranged offset. Thus an embossed spot 3 of ply 1.1 lies in between two embossed spots 4 of the ply 1.2. Both plies 1.1, 1.2 are interconnected by laminating. This is realized by applying a thin glue coating to the heads 10 of the elevated embossed spots 3 of the first ply 1.1. By leading both plies 1.1 and 1.2 through a nip of laminating or so-called marrying rolls (see FIG. 3) both plies 1.1 and 1.2 are adhered to one another.

As is indicated in FIG. 2 the embossed spots 3, 4 again form kind of open compartments 11 in the interface region 6.1 between both plies 1.1, 1.2. Again super absorbent fiber-like particles 8 are laid between both plies 1.1, 1.2 to form a super absorbent layer in this interface region 6.1. The specifications of the fiber particles 8 accord to the features discussed in connection with FIG. 1.

The two plies 1.1, 1.2 of the towel 9 together may have a basis weight of, for example, about 42 g/m$^2$, although the towel 9 may be any suitable basis weight.

Figure 3:
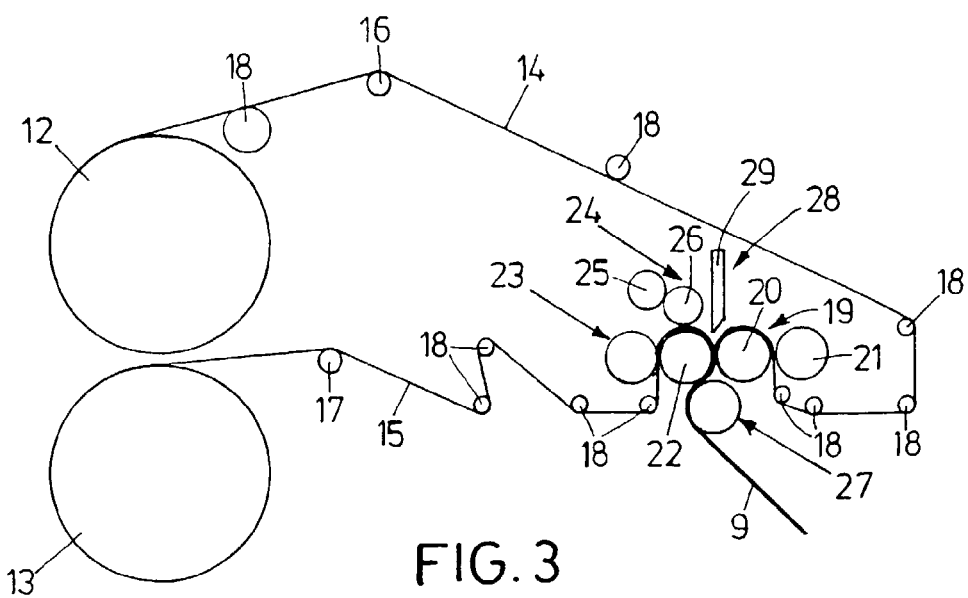
FIG. 3 is a diagrammatic elevation of a paper towel production line.

Referring to FIG. 3, a method and apparatus for producing a two-ply-tissue towel web according to the invention is described. The production process starts from two supply or so-called 'parent' rolls 12, 13, each of a one-ply-tissue of a basis weight of approximately 20 g/m$^2$. The upper and lower tissue webs 14, 15 are guided over a so-called "Spencer Johnson bowed roll" 16, 17 which acts as a straightener to stretch the webs and remove any wrinkles in it. Via several idle guide rolls 18 each web is guided to a combined embossing/laminating unit indicated as a whole by reference numeral 19 in FIG. 3. The upper web 14 enters the nip formed between a first steel embossing roll 20 and a pressure roll 21 covered with an elastic rubber sleeve. By passing this nip the upper web 14 is provided with the embossed spots 3 shown in FIG. 2. After the nip the upper web 14 is guided by an angle of about 180° along steel embossing roll 20, where after it enters another nip between the steel embossing roll 20 and a second steel embossing roll 22. The latter cooperates with a second pressure roll 23 forming the embossing nip for the lower tissue web 15. In this nip the lower tissue web 15 is provided with the embossed spots 4 again shown in FIG. 2. The lower tissue web 15 is also guided around steel embossing roll 22 to enter the nip between both steel embossing rolls 20, 22.

The embossing patterns on both steel embossing rolls 20, 22 are designed and aligned such that the embossed spots 3 on the upper tissue web 14 nest in between the embossed spots 4 of the lower tissue web 15 and vice versa. Accordingly, the two-ply-tissue towel produced on the unit shown in FIG. 3 is of the "nested-embossed" type.

To stably connect the upper and lower tissue web 14, 15 a glue application device 24 is associated to the second steel embossing roll 22. This glue application device 24 comprises a so-called "gravure roll" 25 as metering device to take up a thin glue coating from a glue pan. The glue on gravure roll 25 is taken up by an applicator roll 26 which slightly contacts the heads of the embossed spots 4 on the lower tissue web 15 traveling on steel embossing roll 20. By means of this glue application the heads of the embossed spots 4 of the lower tissue web 15 are adhered to the upper tissue web 14, stably connecting both webs 14, 15. For this sake a so-called "marrying roll" 27 is associated to the lower steel embossing roll 22 directly downstream of the nip between both steel embossing rolls 20, 22. The marrying roll is a rubber covered steel roll which is biased versa steel embossing roll 22 by a regulated hydraulic loading pressure, thus forming a positive nip in order to ply-bond the upper and lower tissue webs 14, 15 together forming a single two-ply-paper towel web.

The embossing/laminating unit may be further provided with a super absorbent fiber feeder 28 which is arranged above the nip between both the steel embossing rolls 20, 22. From the chute 29 super absorbent fibers as specified above are delivered via the chute slot into the interface region between both the upper and lower tissue webs 14, 15. The fibers are metered through a brush and metering roll assembly, fall by gravity and are delivered to the feeder by an homogeneous air suspended flow in an amount of, for example, about 1.0 g/m$^2$.

Due to the described feeding, the super absorbent fibers are both mechanically entrapped in the compartments defined by the embossed spots 3, 4 and adhered to the paper structure by means of the glue ply-bonding the webs 14, 15 together.

Alternative measures to fix the fiber particles 8 between the webs 14, 15 are on the one hand a glue coating sprayed onto at least one of the webs 14, 15 and on the other hand glue filaments forming a network with the super absorbent fiber-like particles 8 on at least one of the tissue webs 14, 15.

In another preferred embodiment of this invention, the super absorbent fiber-like particles are embedded into a layer 7, together with paper fibers, cellulosic fibers, or other non super-absorbing types of fibers. In this embodiment of the present invention, the basis weight of the layer 7 may be between about 3 and about 25 gsm, between about 5 and about 15 gsm or between about 7 and about 13 gsm. In this embodiment, the layer 7 has its own individuality, i.e. can be qualified of individual layer as it has a sufficient mechanical cohesion to be handled as an individual layer of material. It can be preformed in a separate process and be assembled together with the other plies during the converting phase (dry stage). The layer 7 of this embodiment can have a basis weight between about 0.5% and about 50% of the two adjacent plies, between about 10% to about 35%, or about 15% to 25%.

In addition to the general benefits mentioned for the present invention, this embodiment may display specific additional advantages versus prior art and prior industry practice: The layer comprising the super-absorbing particles can be designed and manufactured separately from the paper-making process or the converting process, giving more flexibility in the selection of the desired end characteristics (such as absorbency, liquid retention, softness, flexibility, etc.) for the finished product. The layer 7 acts as a core of super absorbing material in the finished product used by the consumers, with the super-absorbing fiber-like particles being embedded (or trapped or encapsulated) in the layer 7, and the layer 7 itself being sandwiched between the plies. This reduces further the negative effect of dusting and helps maintain a relatively dry surface of the product (by having the fluid trapped in the inner layer of the product). The intimate mixing of super-absorbing fiber-like particles with paper fibers or non super-absorbing fibers further reduces the gel effect that negatively impact the absorbency of the structure, by creating more physical separation (i.e. void space) between the super-absorbing particles.

The benefits of the invention include, but are not limited to the following:

The specific absorbency of the super absorbent fiber particles is increased when lowering the addition level within certain limits. As an example, the specific absorbent capacity—measured by DIN (German Industrial Standard) method 54540, part 4, "Bestimmung der Wasseraufnahme" ("Determination of Water Absorption") of super absorbent fibers being added in a concentration of 2.4% in between the plies of a multiply tissue towel is 208 g/g, whereas the capacity is only 150 g/g when the addition level is 7.1% of the basis weight of the tissue webs. In horizontal modes of testing absorbent capacity, this effect is even more pronounced. For example specific absorptivity of fibers alone was 185 g/g (free swelling) and contained in between tissue plies in a concentration of 1 g/m$^2$ the specific absorptive increased to 380 g/g attributed to the super absorbent fibers.

The absorbency/wet strength ratio can be raised much higher than possible with existing technologies. For example, two-ply-paper towels actually marketed by the applicant reach an absorbency of about 12 g/g and a wet burst of approximately 350 g. By adding about 1 g/m$^2$ or about 3 g/m$^2$ of super absorbent fibers to this product, the absorbency can be increased to about 14 and about 20 g/g, respectively, without negatively affecting the wet burst.

The tissue towel according to the invention feels dryer at the same level of saturation with water/aqueous media, relative to an identical tissue towel with no super absorbent fibers.

At levels of less than about 2 g/m$^2$ the so-called "gel effect" is negligible when the tissue towel comprising super absorbent fibers is wetted.

Further, contrary to the prior art, the super absorbent materials constitute a separate layer between at least two adjacent plies of the tissue web. This means that the addition of the super absorbent material can be completely separate from the papermaking process for the tissue web itself. Tissue webs can be produced as usual where after the super absorbent particles can be added in between two plies, as particles, in a mix with other components or as part of an individual layer comprising super absorbent fiber-like particles and non super absorbent fibers. This in turn means that the super absorbent material does not get into contact with the wet papermaking pulp. Therefore, no negative effects are generated by wetting the super absorbent materials prior to incorporation. Although the prior art describes certain advantages of the so-called "pre-swelling" of the super absorbent materials it is in fact possible that by this pre-swelling the absorbency capacity of the super absorbers can be negatively affected.

Another feature of the invention is the fiber-like design of the super absorbent particles. The size and shape of the super absorbers help to avoid problems in connection with the particles flowing out of the towel product, the so-called "dusting". When using regular super absorbent powder particles, like super absorbent granules, there would be a health risk in case such granules dust off into the air and are inhaled. Further on, the flowing-out of super absorbent particles from the towel would deteriorate the absorptive properties of the towel. These problems are avoided by using fiber-like particles, which have a kind of inherent "grip" in between the plies of the tissue towel.

Another and especially surprising advantage of incorporating super absorbent fiber-like particles into the interface region in between two adjacent plies of the tissue webs lies in the fact that the specific absorbent capacity of such fibers increases when decreasing amounts of super absorbent fibers are used. The specific absorbent capacity attributed to the super absorbent fibers alone increases from, for example, about 150 to about 208 g/g when decreasing the add-on level of the super absorbent fibers from about 7.1% to about 2.4% by weight of the basis weight of the tissue plies. This effect seems to be a result of the unrestrained swelling of the super absorbent fibers when they are further apart from each other. In this state—even in the loaded condition—the fibers do create voids in their surroundings which act as reservoirs to trap additional water outside them but within the interface between two plies of tissue web.

Preferred embodiments of the invention refer to the physical properties of the super absorbent fiber-like particles and various ways to enhance the fixation of the fiber-like particles in between the tissue webs without effectively deteriorating the absorbent capacity of the super absorbers.

While particular embodiments of the present invention have been illustrated and described, it would be obvious to those skilled in the art that various other changes and modifications can be made without departing from the invention. It is therefore intended to cover in the dependent claims all such changes and modifications that are within the scope of this invention.

What is claimed is:

1. A multi-ply-tissue product comprising:
   at least two plies of tissue interconnected to each other at an interface region, the at least two plies of tissue being interconnected by a plurality of embossments, the embossments forming at least one compartment disposed within the interface region; and
   a layer comprising super absorbent fiber-like particles disposed within the interface region, at least a portion of the super absorbent fiber-like particles being disposed within the at least one compartment; and,
   wherein the basis weight of the layer comprising super absorbent fiber-like particles is between about 0.5% and about 50% of the overall basis weight of the two adjacent plies of the tissue defining the interface region;
   wherein the multiply tissue is selected from the group consisting of paper towels, napkins, and hankerchiefs; and wherein the super absorbent fiber-like particles are present in the layer at a basis weight of about 0.2 to about 5.0 g/m².

2. The multi-ply tissue product of claim 1 wherein the super absorbent fiber-like particles are present in the layer at a basis weight of about 0.5 to about 2.0 g/m².

3. The multi-ply tissue product of claim 1 wherein the basis weight of the layer comprising super absorbent fiber-like particles is between about 1% and about 3% of the overall basis weight of the two adjacent plies of the tissue defining the interface region.

4. The multi-ply tissue product of claim 1 wherein the super absorbent fiber-like particles have a length from about 3 to about 30 mm.

5. The multi-ply tissue product of claim 4 wherein the super absorbent fiber-like particles have a length of about 4 to about 10 mm.

6. The multi-ply tissue product of claim 1 wherein the super absorbent fiber-like particles have a fiber diameter from about 5 to about 50 μm.

7. The multi-ply tissue product of claim 6 wherein the fiber diameter is from about 20 to about 30 μm.

8. The multi-ply tissue product of claim 1 wherein the super absorbent fiber-like particles have a density from about 1.0 to about 2.0 g/cm³.

9. The multi-ply tissue product of claim 8 wherein the density of the super absorbent fiber-like particles is from about 1.3 to about 1.5 g/cm³.

10. The multi-ply tissue product of claim 1 wherein the super absorbent fiber-like particles are fixed by a glue coating providing for the interconnection of the two plies of tissue.

11. The multi-ply tissue product of claim 1 wherein the super absorbent fiber-like particles are fixed by a glue coating sprayed onto at least one of the plies of the tissue.

12. The multi-ply tissue product of claim 1 wherein the super absorbent fiber-like particles are fixed by glue filaments, forming a network with the super absorbent fiber-like particles on at least one of the plies of tissue webs.

13. The multi-ply tissue product of claim 1 wherein the layer comprising super absorbent fiber-like particles consists essentially of super absorbent fiber-like particles.

14. The multi-ply tissue of claim 13 wherein the basis weight of the layer comprising super absorbent fiber-like particles is between about 0.5% and about 10% of the overall basis weight of the two adjacent plies of the tissue defining the interface region.

15. The multi-ply tissue product of claim 1 wherein the layer comprising super absorbent fiber-like particles includes cellulosic paper fibers and forms an individual layer in which the super absorbent fiber-like particles are embedded into the layer together with the cellulosic paper fibers.

16. The multi-ply tissue product according to claim 15 wherein the basis weight of the layer comprising super absorbent fiber-like particles is in the order of about 10% to about 35% of the overall basis weight of the two adjacent plies of said tissue defining the interface region.

17. The multi-ply tissue product of claim 1 wherein the basis weight of the layer comprising super absorbent fiber-like particles is between about 3 and about 25 gsm.

* * * * *